(12) United States Patent
Collins

(10) Patent No.: US 9,050,897 B1
(45) Date of Patent: Jun. 9, 2015

(54) MODIFICATION POWER SYSTEM KIT FOR EXISTING VEHICLE

(71) Applicant: Walter Collins, Sacramento, CA (US)

(72) Inventor: Walter Collins, Sacramento, CA (US)

( * ) Notice: Subject to any disclaimer, the term of this patent is extended or adjusted under 35 U.S.C. 154(b) by 0 days.

(21) Appl. No.: 14/301,794

(22) Filed: Jun. 11, 2014

(51) Int. Cl.
| | | |
|---|---|---|
| *B60L 11/12* | (2006.01) | |
| *B60L 11/18* | (2006.01) | |
| *H02P 3/14* | (2006.01) | |
| *B60L 1/00* | (2006.01) | |
| *H02K 53/00* | (2006.01) | |

(52) U.S. Cl.
CPC .............. *B60L 11/12* (2013.01); *B60L 11/1809* (2013.01); *H02P 3/14* (2013.01); *B60L 1/006* (2013.01); *Y10S 415/916* (2013.01); *H02K 53/00* (2013.01)

(58) Field of Classification Search
CPC .......................... B60W 10/08; Y02T 10/7077
See application file for complete search history.

(56) References Cited

U.S. PATENT DOCUMENTS

| | | | |
|---|---|---|---|
| 6,373,145 B1 * | 4/2002 | Hamrick ......................... 290/44 |
| 7,597,164 B2 * | 10/2009 | Severinsky et al. ......... 180/65.27 |
| 2006/0168968 A1 * | 8/2006 | Zielinski et al. ................ 60/778 |
| 2006/0244411 A1 * | 11/2006 | Wobben ........................ 320/104 |
| 2007/0144713 A1 * | 6/2007 | Sugimoto et al. ............. 165/140 |
| 2010/0108416 A1 * | 5/2010 | Lind ........................... 180/65.31 |
| 2012/0324910 A1 * | 12/2012 | Shete et al. .................... 62/53.2 |

* cited by examiner

*Primary Examiner* — Tulsidas C Patel
*Assistant Examiner* — Sean Gugger
(74) *Attorney, Agent, or Firm* — Heisler & Associates

(57) ABSTRACT

A kit allows for replacement of an internal combustion engine with a traction motor, batteries and electric generator. A current controller can be provided for optimization of electrically interconnections of the generator and batteries to the traction motor. Various electric power generating accessories can be incorporated into the kit including ram air turbines and solar panels. Cooling for the equipment can be supplied by a radiator and fan which can also optionally function as a ram air turbine. Power output accessories can be incorporated into the kit including an inverter for supplying AC power to AC power utilizing tools and other equipment, as well as emergency power for stationary facilities.

10 Claims, 4 Drawing Sheets

MODIFICATION POWER SYSTEM KIT FOR EXISTING VEHICLE

FIELD OF THE INVENTION

The following invention relates to power plants for vehicles which supply motive power for the vehicle. More particularly, this invention relates to kits which allow for the substitution of an internal combustion engine from a vehicle and its replacement with a traction motor, batteries and an electric generator.

BACKGROUND OF THE INVENTION

Road going vehicles have a large number of complex systems which provide the vehicle with efficient operation, safety, comfort and effectiveness in completing the specific transportation tasks for which they are designed. As one example, vehicle suspension systems are designed to carry the particular vehicle over an underlying roadway surface, often at high speeds, in a manner which maintains traction, comfort and safety for riders and cargo. Suspension systems are particularly designed for the specific vehicle. For instance, large truck suspension systems are designed to effectively support the vehicle above an underlying surface with a variety of different vehicle weights, because the vehicle must operate safely both when empty and when full. Much consideration and expense goes into the design and construction of such suspension systems. Other vehicle systems are similarly carefully designed, and have similarly evolved to a high degree of sophistication.

For the last one hundred years nearly all road going vehicles have been driven by an internal combustion engine. While internal combustion engines have a variety of advantages and are generally effective in powering road going vehicles, they do have certain drawbacks. In the last decade a greater number of "hybrid" vehicles have been brought into service. Such hybrid vehicles still have an internal combustion engine, but also benefit from the unique and beneficial attributes of some form of electric motor and electric power supply integrated in some fashion into the power train of the vehicle. Examples of the benefits of hybrid power trains include the opportunity to take advantage of regenerative braking, the high torque available from even a low horse power electric motor, especially at low speeds, the opportunity to have an internal combustion engine operate closer to a steady state optimal efficiency, rather than needing to cover a large dynamic range of performance, and the decreasing of the size of the combustion engine while still maintaining overall vehicle peak power requirements.

One factor which has inhibited the introduction of hybrid power trains and other power trains including electric power equipment therein, is the large number of complex vehicle subsystems which must be effectively designed if a new vehicle is to be completely redesigned and built "from scratch." If one desires to develop such a vehicle including an electric power supply, one must invest appropriately to provide designs not only for the new power train, but also for each of the various systems required in the design of the vehicle. Thus, an exceptionally large financial expense, timeframe, manpower and overall risk burden must be shouldered to effectively bring such a new vehicle to market. Even if existing subsystem technology is available for license, the licensing cost is encountered.

Accordingly, a need exists for a kit which can allow all of the vehicle subsystems other than the power plant to still be utilized, and merely replace the internal combustion engine with a replacement power plant including electric motor components. Such a kit would be especially useful when an internal combustion engine or transmission in a used vehicle is nearing the end of its useful life. Supplying such a kit would also allow a large number of independent individuals to utilize such a kit to modify their own vehicles or to provide the custom service of vehicle modification for others. A large number of high quality rewarding jobs would thus be provided for a large number of individuals. This opportunity is particularly great for light and heavy duty trucks and other commercial vehicles where the benefits of power trains including an electric motor drive component therein can have the benefits thereof enjoyed on a potentially larger scale, and wherein room is often available to house the elements of the kit.

SUMMARY OF THE INVENTION

With this invention a kit is provided for conversion of a vehicle, and most typically a truck or other commercial vehicle, from being powered merely by an internal combustion engine to instead being powered by a substitute power train including at least one electric motor drive component. The substitute power train includes a traction motor with a shaft power output coupled to a drive shaft of the vehicle. Batteries are coupled to the traction motor to supply electric power to the traction motor. A generator is provided which can operate independently as a traction motor and combust a fuel to generate electricity and charge the batteries. A current controller is preferably provided, such as interposed between the batteries and the traction motor, or otherwise integrated into the kit. The current controller acts as a transformer, inverter and otherwise as a device to transfer electric power in from the batteries or other sources, to electric power out to the traction motor in a form which is most optimal for operation of the traction motor.

The current controller can have multiple inputs if desired. For instance, the current controller can be supplied with power from the batteries as well as being supplied with power from the generator, and other onboard power sources. As an alternative, the current controller can be interposed between the batteries and the traction motor with various other onboard power sources coupled to the batteries or to other electric power management devices disbursed within the overall system.

Other onboard power systems can include at least one ram air turbine which can be deployed into an airstream, typically while the vehicle is moving over a roadway, to generate electric power and supply this electric power either directly to the battery or to the current controller. Solar panels, such as in the form of photovoltaic cells, can be mounted upon the vehicle and have electric power therefrom supplied to the batteries, either directly or through the current controller, so that power for the vehicle is augmented from renewable solar energy.

In a preferred form of the invention the current controller not only conditions electric power for supply to the traction motor, but also supplies electric power for output to a stationary electric power utilizing facility, such as a residential or commercial building. The current controller can include an inverter so that this power is outputted as AC power. The vehicle can thus be utilized, such as in emergency circumstances, as a standby electric power generator which can easily be brought adjacent the building, and commence operation, supplying electric power to the building, such as during a power outage. The inverter can also have standard AC power outlets which can feed portable equipment, such as electric power tools which might be utilized by a contractor having a truck configured with the kit of this invention.

In addition to the traction motor being configured to drive the wheels of the vehicle, this connection can be utilized in reverse so that the traction motor can generate electricity through a regenerative braking arrangement. Braking can be further facilitated by interconnecting the ram air turbine to optionally provide back EMF to the traction motor to act as a brake on the traction motor and drive train when additional braking is required.

OBJECTS OF THE INVENTION

Accordingly, a primary object of the present invention is to provide a kit for replacing an internal combustion engine of a vehicle with a power system including an electric traction motor, batteries and a generator.

Another object of the present invention is to provide a simplified method for converting a vehicle from being powered merely by an internal combustion engine to being powered by a traction motor.

Another object of the present invention is to provide a kit for converting trucks and commercial vehicles to enjoy the benefits of being driven by a power plant including an electric motor.

Another object of the present invention is to provide a truck or other commercial vehicle which utilizes multiple different sources of power through batteries and a traction motor to power the vehicle.

Other further objects of the present invention will become apparent from a careful reading of the included drawing figures, the claims and detailed description of the invention.

DESCRIPTION OF THE PREFERRED EMBODIMENT

Figure 1:
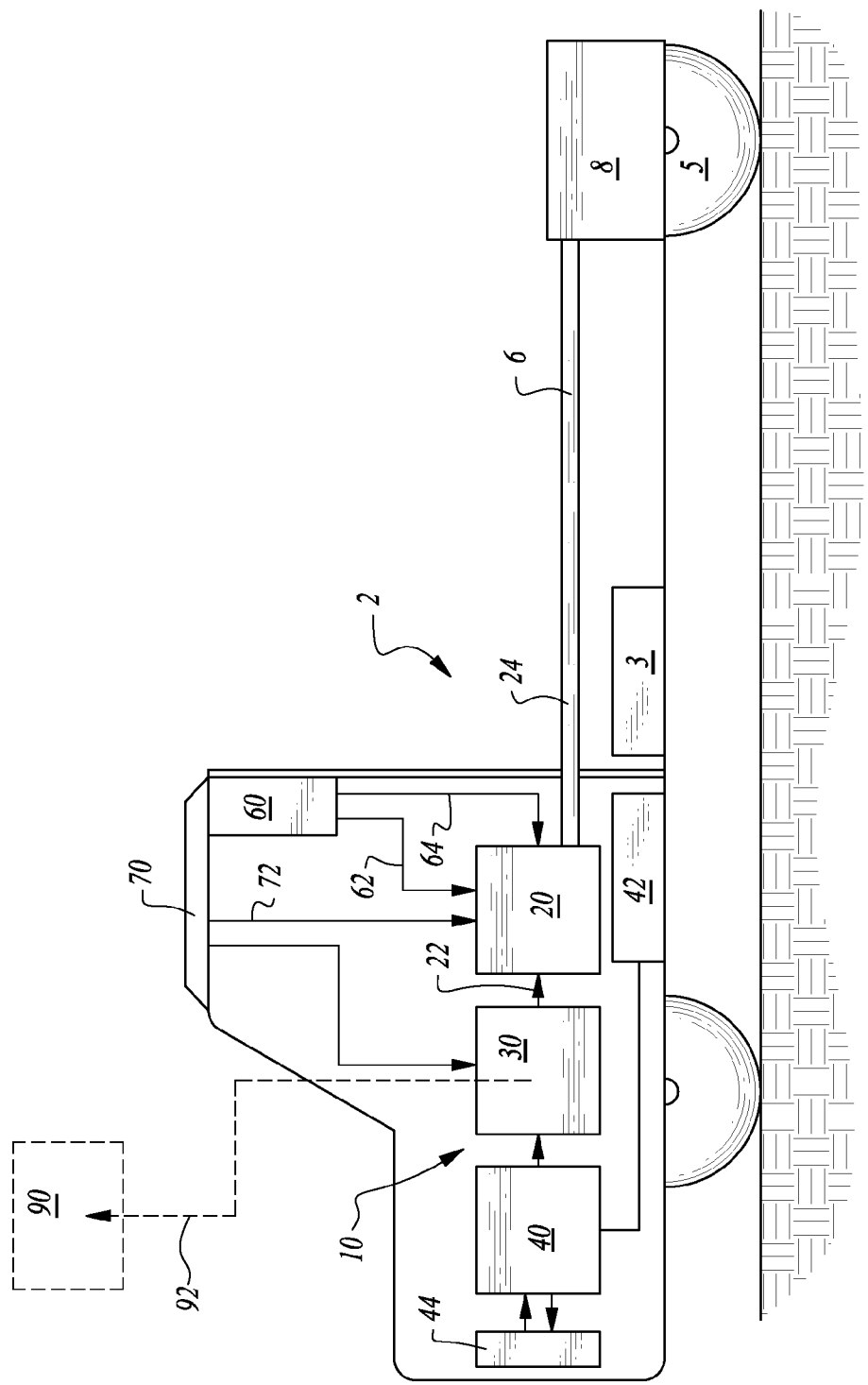
FIG. 1 is a side elevation view representing schematically the kit of this invention after it has been installed into a truck or other commercial vehicle.

Referring to the drawings, wherein like reference numerals represent like parts throughout the various drawing figures, reference numeral 10 (FIGS. 1 and 3) is directed to a kit to convert an existing power train 1 (FIG. 2) of a vehicle 2 with the modified power system kit 10 of this invention. The modification power system includes a traction motor 20 and batteries 30, as well as a generator 40 which replace the existing power train 1 and is particularly effective in converting a truck or other commercial vehicle from being powered merely by an internal combustion engine 4 (FIG. 2) to being powered by the traction motor 20.

In essence, and with particular reference to FIG. 1, basic details of the kit 10 of this invention are described. The kit 10 includes a traction motor 20 which provides motive power to a drive shaft 6 of the existing vehicle 2. Batteries 30 are coupled to the traction motor 20 to supply electric power to the traction motor 20. A generator 40 is coupled to the batteries and is configured to combust a fuel (or multiple fuels) to generate electric power for charging of the batteries 30. A current controller 50 is optionally provided (FIG. 3) which can be interposed between the batteries 30 and the traction motor 20 (or elsewhere) and can receive power inputs other than from the batteries 30 and/or the generator 40, and optionally condition the power for supply to the traction motor 20, as well as supplying power to an adjacent facility 90 (FIG. 1), such as through an inverter 52. Other electric power generating accessories can be incorporated into the kit 10 including at least one ram air turbine 60 and solar panels 70. These electric power generating accessories can supply electric power either to the batteries 30 or to the current controller 50, or optionally directly to the traction motor 20.

Figure 2:
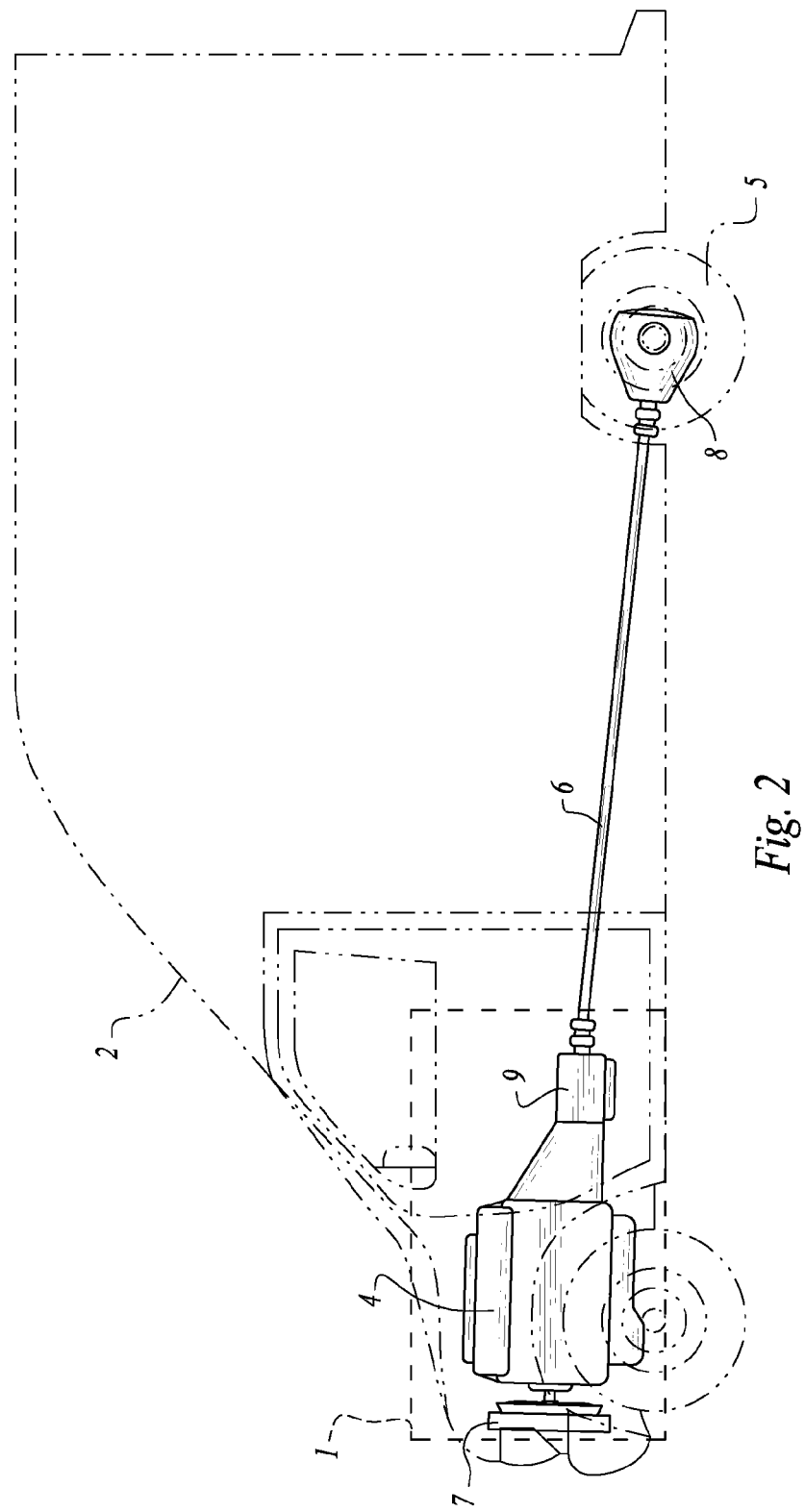
FIG. 2 is a side elevation view of a truck or commercial vehicle before modification with the kit of this invention, and illustrating elements of the existing power train of the vehicle to be replaced by the kit of this invention.

More specifically, and with particular reference to FIG. 2, basic details of the existing vehicle 2 which is to be modified by the kit 10 of this invention are described. The existing vehicle 2 could be any form of road going vehicle, but most preferably is a truck or commercial vehicle. As much of the existing vehicle 2 as possible is left unmodified so that the inclusion of the kit 10 with the existing vehicle 2 can be as simple as possible and still provide all of the benefits of the kit 10. Also, the highly evolved subsystems of the vehicle 2 beneficially remain intact. The kit 10 can be standardized to work with many different types of vehicles in a single form, or the kit can be supplied in modified forms customized to work with different vehicles. For instance, different vehicles have a volume and geometry of space available after the internal combustion engine has been removed and have a variety of different orientations of drive shaft 6 which need to be accommodated by the kit 10. As an alternative, the kit 10 can be configured differently for each vehicle with which it is intended to be used, to make the installation of the kit 10 as simple as possible.

The existing vehicle 2 includes an internal combustion engine 4 coupled to a drive shaft 6 which supplies power to drive wheels 5 through a differential 8. A transmission 9 is typically also interposed between the internal combustion engine 4 and the drive shaft 6. A radiator 7 is typically supplied to cool the internal combustion engine 4. This radiator 7 typically includes a fan adjacent thereto to augment heat transfer to cool the engine 4 as efficiently as possible. Of these existing portions of the power train of the existing vehicle 2, the internal combustion engine 4 and transmission 9 are removed. At least portions of the drive shaft 6 as well as the drive wheels 5 and differential 8 remain unmodified. The radiator/fan 7 is typically removed but could in some embodiments be put to beneficial use in cooling portions of the kit 10.

Figure 3:
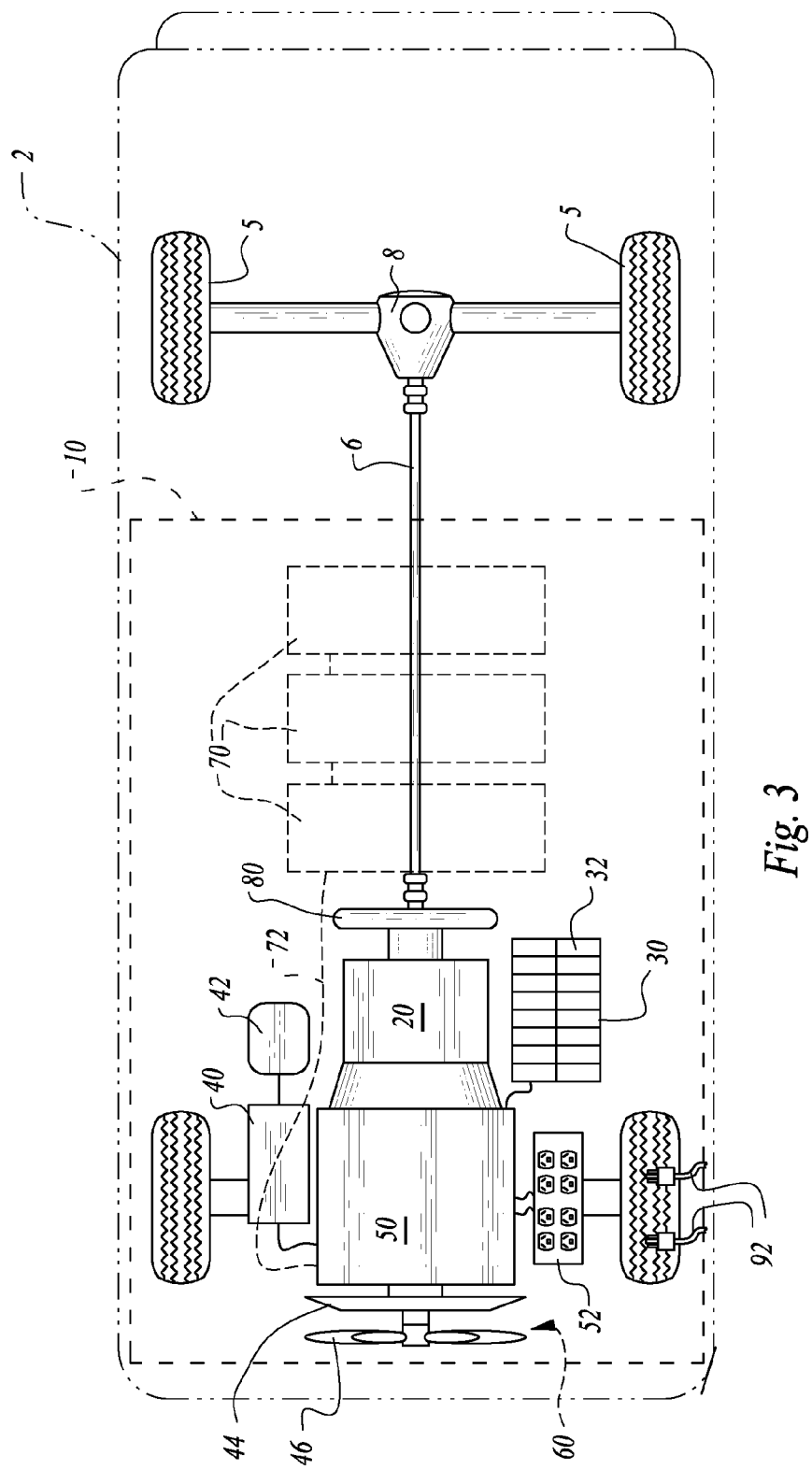
FIG. 3 is a top plan view of that which is shown in FIG. 2 after the kit of this invention in one form has been substituted for the existing power train.

With particular reference to FIGS. 1 and 3, details of the traction motor 20 of the kit 10 are described, according to a most preferred embodiment. The traction motor is an electric motor which converts electric power into mechanical shaft power. Most typically, this traction motor converts DC electric current into shaft power. Traction motors similar to those utilized in diesel electric locomotives, but operating on a typically significantly smaller scale for road going vehicles, could be utilized for the traction motor 20. One suitable motor might also be the Interior Permanent Magnet traction motor developed by the General Electric Company through its GE Global Research Division of Niskayuna, N.Y.

The traction motor 20 includes an electric input 22 typically supplied with DC electric power from the batteries 30. The traction motor 20 also includes shaft power output 24 coupled to the drive shaft 6. Most preferably, a fly wheel 80 is supplied either mounted to the traction motor 20 at its shaft power output 24, or mounted to the drive shaft 6 adjacent to the shaft power output 24. The fly wheel 80 enhances angular momentum of the traction motor 20 and drive shaft 6, to help smooth out power supplied by the drive shaft 6 for motive power of the vehicle. The fly wheel 80 can also act as a fan if desired by having fan blades mounted thereto for cooling of the traction motor 20. The traction motor 20 can include cooling fluid circuits therein which can be supplied with cooling from the radiator 7 of the existing vehicle (FIG. 2) or from an auxiliary radiator 44 (FIGS. 1 and 3) to keep the traction motor 20 operating optimally.

The traction motor 20 is preferably of a type which can be easily configured between supplying power to the drive shaft 6 and absorbing power from the drive shaft 6, such as in the form of regenerative braking to slow the vehicle when the vehicle is to be slowed down or brought to a stop. When operating to perform regenerative braking, the traction motor 20 becomes an electric power generator and is coupled to the batteries 30 through the electric input 22 in such a way that the batteries 30 can be charged by the traction motor 20, when such regenerative braking is in operation.

With continuing reference to FIG. 3, details of the batteries 30, generator 40 and current controller 50 are described. The batteries 30 provide a source of electric current which can be stored and supplied upon demand. In a preferred form of the invention, the battery 30 is in the form of a series of separate cells 32. These cells could be any of a variety of different known battery chemistries, with lithium ion battery cells 32 being one suitable option. The batteries 30 can also be cooled, either by air or by a cooling fluid circuit coupled to the radiator 7 of the original vehicle or a substitute radiator 44 (FIGS. 1 and 3). The battery 30 benefits from being expandable and replaceable separate from other portions of the kit 10 such as to expand performance of the modification power system or to replace batteries 30 which are no longer operating optimally.

The generator 40 provides electric charge for the batteries 30 so that they can properly power the traction motor 20. The generator 40 can either operate continuously or can operate intermittently when the batteries 30 have sufficient charge to operate the traction motor 20 without the generator 40 operating. The generator 40 benefits from not (or only rarely) needing to be throttled, but rather can operate in a steady state fashion at a power output level which is optimized for fuel efficiency, emissions and/or other criteria. The generator 40 could be gasoline powered, diesel powered or powered by some alternative fuel, such as compressed natural gas or ethanol. The generator 40 could also conceivably be powered by hydrogen either through combustion of the hydrogen or as a fuel cell. The generator 40 has at least one fuel tank 42. If the generator 40 is a dual fuel generator which can operate on more than one fuel, separate fuel tanks 42 can be supplied.

The current controller 50 is most preferably provided adjacent the traction motor 20 and interposed between the batteries 30 and the traction motor 20 and in between the generator 40 and the traction motor 20. The current controller 50 supplies electric current back and forth to the batteries 30 depending on whether the batteries 30 are being charged or discharged. The current controller 50 supplies electric power to the traction motor 20 along the electric input 22 in an amount which is optimal for a traction motor 20 operation. This current controller 50 preferably includes a throttle/speed controller input control from an operator of the vehicle which causes the current controller 50 to supply electric input 22 to the traction motor 20 in accordance with the desires of the operator to speed up the vehicle or maintain speed for the vehicle.

The current controller 50 also acts as a combiner in some embodiments to combine electric power from different sources. The current controller 50 preferably also acts as a transformer to transform current between different voltages and between AC and DC operation. The current controller 50 is, in one embodiment cooled through air cooling, either with mere conduction to air or with a fan to enhance cooling of the current controller 50. Liquid cooling through a heat transfer fluid circuit can also be supplied between the radiator 44 (or radiator 7) and the current controller 50 if required or beneficial for optimal performance of the current controller 50.

The current controller 50 can also supply power to an inverter 52. The inverter 52 is able to output AC power. AC power utilizing appliances can be plugged into receptacles associated with the inverter 52 (FIG. 3), such as when a construction contractor has electric power tools to be operated at a job site where fixed power is not yet available, by plugging directly into the inverter 52 of the vehicle modified with the kit 10 of this invention. Alternatively, an adjacent facility 90 (FIG. 1) can be supplied through an interconnect line 92 (FIG. 1) with AC electric power from the inverter 52 (FIG. 3) so that an adjacent building can be supplied with electric power, such as in an emergency when power loss has occurred for the building or other facility.

With particular reference to FIGS. 1 and 3, details of the ram air turbine 60 are described, according to a preferred embodiment. At least one ram air turbine 60, and preferably a pair of ram air turbines 60 are provided on an upper portion of a cab portion of the vehicle 2 (FIG. 1) which is modified with the kit 10. The ram air turbines 60 include an impeller/propeller which is brought into orientation with a passing airstream to be caused to rotate and drive a generator, thus supplying electric power for the kit 10. This electric power can be supplied either directly to the traction motor 20, directly to the batteries 30 (especially if the power is generated or transformed into DC power) or be supplied to the current controller 50. Where a left ram air turbine 60 and right ram air turbine 60 are supplied, a left output 62 and right output 64 can be separately supplied, such as directly to the traction motor 20, or the traction motor 20 through intervening equipment.

Moving air power supply to the ram air turbine 60 can be provided by the movement of the vehicle down a roadway, by having the ram air turbine 60 oriented facing the ongoing airflow. It is also conceivable even when the vehicle is stationary, that ambient wind conditions could generate sufficient power to be harvested by the ram air turbine 60 for charging of the batteries. The ram air turbines 60 can be mounted in a manner allowing them to be deployed or retracted depending on whether they are going to be utilized or not. Such deployment might include pivoting about a pivot point below the ram air turbine impeller so that the impeller can pivot into the oncoming airstream. An arm supporting the impeller off this pivot point can allow for rotation of the impeller if desired, so that the impeller can face ambient wind having a variety of different orientations. The impeller can be fitted with a geometry which causes it to naturally turn into the wind, such as by having a drag structure behind the ram air turbine, somewhat akin to a windmill, so that the ram air turbine is always properly oriented for optimal power generation.

In one form of the invention, the ram air turbine 60 is coupled to the traction motor 20 in a manner which facilitates back EMF being supplied to the traction motor 20 and braking associated with such back EMF. When the vehicle requires braking, the interconnection of the ram air turbine 60 to the traction motor 20 is switched so that such back EMF is available for braking. Such additionally braking is particularly advantageous on trucks and large commercial vehicles where braking loads of a loaded vehicle can be significant and provide great strain on friction brake mechanisms.

An optional additional location for a ram air turbine 60 is adjacent (typically in front of) the radiator 44. A motor can be positioned to either drive a fan 46 or to be driven by the fan 46 and generate electricity (as a ram air turbine). In one embodiment, separate ram air turbines 60 are both mounted to the cab (FIG. 1) and adjacent the radiator (FIG. 3).

With particular reference to FIGS. 1 and 3, details of solar panels 70 are described as part of an alternative embodiment of the kit 10 of this invention. Solar panels 70 are optionally provided on surfaces of the existing vehicle 2 modified with the kit 10 of this invention. The solar panel 70 includes photovoltaic cells which can convert solar radiation into electric power. This electric power (typically DC) would be typically connected to an output 72 leading either to batteries 30 or directly to the traction motor 20. Such electric power from the solar panel 70 could also alternatively be supplied to the current controller 50 (FIG. 3) for combining with other sources of electric power and for supply of electric charge to the batteries 30, or electric power to the traction motor 20, or to the inverter 52 to supply AC power for powering adjacent equipment.

Figure 4:
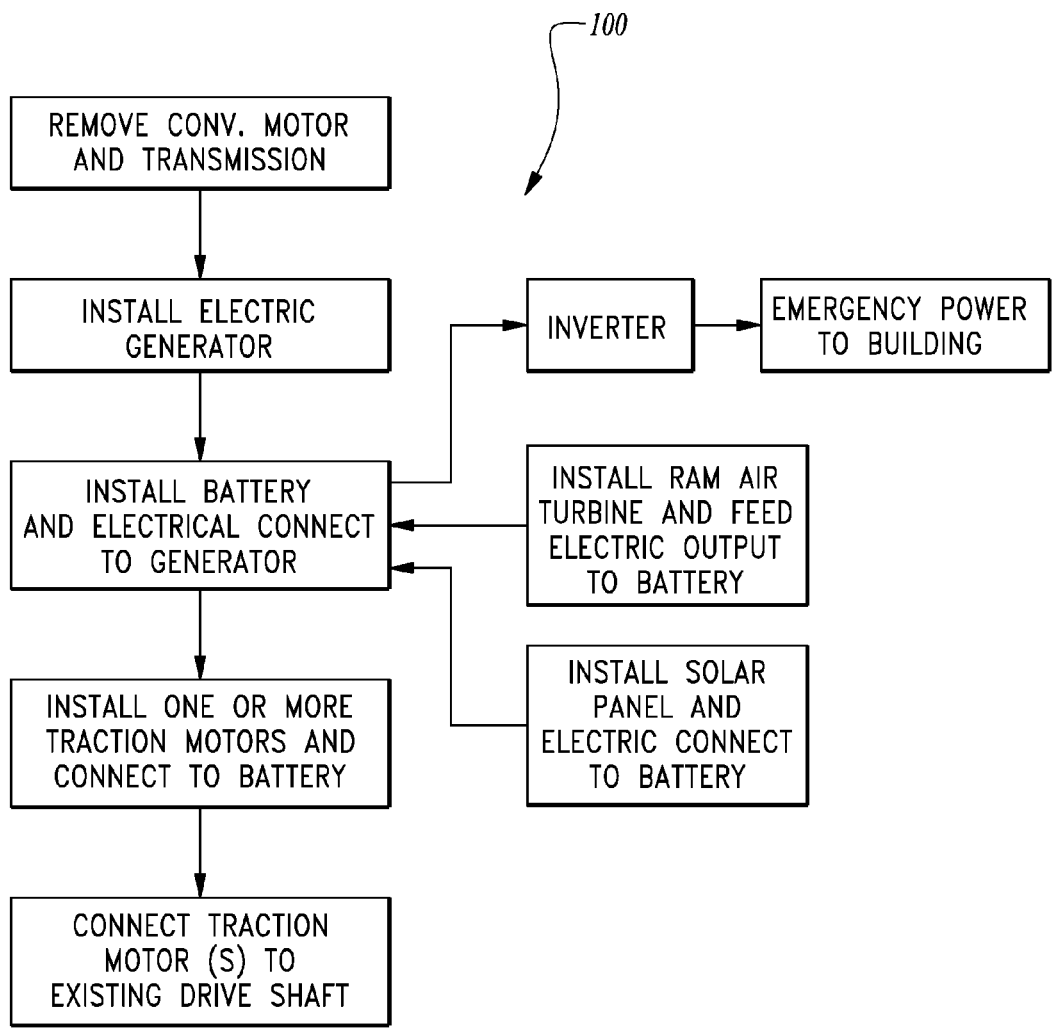
FIG. 4 is a flow chart illustrating the steps involved in the method of modifying the existing power train of a vehicle with a modified power train including a traction motor therein.

With particular reference to FIG. 4, details of the conversion method 100 of this invention are described. In this flow chart a first step of removing the conventional internal combustion motor and transmission is first performed. Then an electric generator 40 is installed, as part of the kit 10 of this invention. Batteries 30 are also installed and connected to the generator 40. One or more traction motors 20 are then connected to the battery 30. In one embodiment, separate traction motors can be provided for each wheel or set of wheels which are to act as drive wheels for the vehicle. Finally, the traction motor is connected to existing drive shafts of the vehicle.

If desired as further alternatives, ram air turbines 60 can be installed to feed electric output to the battery or other portions of the kit 10. Solar panels 70 can be installed on upper surfaces of the vehicle and interconnected to the battery or other portions of the kit 10. While FIG. 1 shows solar panels 70 only on the cab of the vehicle, large surface areas available on top surfaces of trailers and vans can be fitted with solar panels 70 according to this invention to provide a greater amount of electric power generation on the vehicle modified by the kit 10 of this invention. Finally, if desired an inverter and emergency power interconnect equipment can be coupled to the kit of this invention so that the vehicle modified by the kit 10 can further be provided in a manner which allows output electric power to be supplied from the vehicle.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A kit for modification of a power system of an existing vehicle, the existing vehicle having an internal combustion engine coupled to a drive shaft and drive wheels driven by the drive shaft, the kit consisting of:
   a traction motor with an electric power input and a shaft power output, said shaft power output attachable to the drive shaft of the existing vehicle;
   a battery, said battery coupled to said electric power input of said traction motor;
   an electric generator configured to be powered by combustion of a fuel to produce electric power, said electric generator having an electric power output coupled to said battery;
   wherein a current controller is interposed between said battery and said traction motor, said current controller adapted to modify at least one of current and voltage from at least one current controller input, said current controller outputting electric power to the traction motor;
   said current controller coupled to a vehicle operator control system including at least a throttle for controlling vehicle speed;
   wherein said current controller includes an inverter, said inverter converting DC power from said current controller into AC power, said inverter including at least one interface for an interconnect line to supply AC electric power from the existing vehicle to AC electric power utilizing equipment separate from the existing vehicle;
   wherein a radiator is oriented to receive airflow therethrough and to transfer heat from a cooling fluid, said cooling fluid routed to at least one of said inverter, said current controller, said battery, said traction motor and said electric generator;
   wherein a fan is located adjacent said radiator, said fan operating to affect a rate of airflow through said radiator, said fan also rotatable based on airflow striking against said fan with said fan coupled to an electric generator to supply electric power to said current controller;
   wherein at least one photovoltaic cell is coupled to said battery through a solar power output, said photovoltaic cell mountable upon a surface of the existing vehicle;
   wherein a fly wheel is coupled to a shaft power output of said traction motor, said fly wheel enhancing angular momentum of said drive shaft; and
   wherein at least one ram air turbine is coupled to the existing vehicle located spaced from said fan, said ram air turbine including an additional generator which converts rotational shaft power from said ram air turbine into electric power, said ram air turbine including an electric power output coupled at least indirectly to said traction motor to provide additional electric power input to said traction motor.

2. The kit of claim 1 wherein a pair of ram air turbines are coupled to the existing vehicle on left and right upper sides of a cab of the existing vehicle.

3. The kit of claim 1 wherein said electric power output from said ram air turbine is coupled to said traction motor through a switch, said switch adapted to supply electric power from said ram air turbine either to further energize said traction motor or to provide back-EMF braking of said traction motor.

4. The kit of claim 3 wherein said traction motor is convertible from a power supplying mode and a regenerative braking mode where said traction motor is driven by said drive shaft and produces electricity routed back to said battery for charging of said battery, while braking rotational velocity of said drive wheels.

5. The kit of claim 1 wherein said electric generator is in the form of a multi-fuel generator, and wherein at least two separate fuel tanks are provided coupled to said electric generator, each of said at least two tanks carrying a different fuel therein.

6. A method for modification of a power system of an existing vehicle, the existing vehicle having an internal combustion engine coupled to drive wheels through a drive shaft and differential, the method steps consisting of:
   removing the internal combustion engine from the vehicle;
   inserting into the vehicle a traction motor with an electric power input and a shaft power output, the shaft power output coupled to the drive shaft;
   placing a battery into the vehicle, the battery coupled to the electric power input of the traction motor;
   locating an electric generator into the vehicle, configured to produce electric power, the electric generator having an electric power output coupled to the battery, mounting a photovoltaic cell on the vehicle and outputting electric power from the photovoltaic cell to the battery;
   interposing a current controller between the battery and the traction motor, the current controller adapted to modify at least one of current and voltage from at least one current controller input, the current controller outputting electric power to the traction motor, the current controller coupled to a vehicle operator control system including at least a speed controller for controlling vehicle speed, the current controller including an inverter, the inverter converting DC power from said current controller into AC power, the inverter including at least one interface for an interconnect line to supply AC electric power from the existing vehicle to AC electric power utilizing equipment separate from the existing vehicle;
   orienting a radiator to receive airflow therethrough and to transfer heat from a cooling fluid, the cooling fluid routed to at least one of the inverter, the current controller, the battery, the traction motor and the electric generator;
   wherein a fan is located adjacent the radiator, the fan operating to affect a rate of airflow through the radiator, the fan also rotatable based on airflow striking against the fan with the fan coupled to an electric generator to supply electric power to the current controller; and
   wherein said electric generator is in the form of a multi-fuel generator, and wherein at least two separate fuel tanks are provided coupled to said electric generator, each of said at least two tanks carrying a different fuel therein.

7. The method of claim 6 including the further step of mounting at least one ram air turbine on the vehicle with the ram air turbine configured to deliver electric power at least indirectly to the traction motor.

8. The method of claim 7 wherein a pair of ram air turbines are coupled to the existing vehicle on left and right upper sides of a cab of the existing vehicle.

9. The method of claim 7 wherein the electric power output from the ram air turbine is coupled to the traction motor through a switch, the switch adapted to supply electric power from the ram air turbine either to further energize the traction motor or to provide braking of the traction motor.

10. The method of claim 9 wherein the traction motor is convertible from a power supplying mode to the drive shaft and a regenerative braking mode where the traction motor is driven by the drive shaft and produces electricity routed back to the battery for charging of the battery.

* * * * *